(No Model.)
A. McI. WILLIAMSON.
TIRE.
No. 592,184. Patented Oct. 19, 1897.
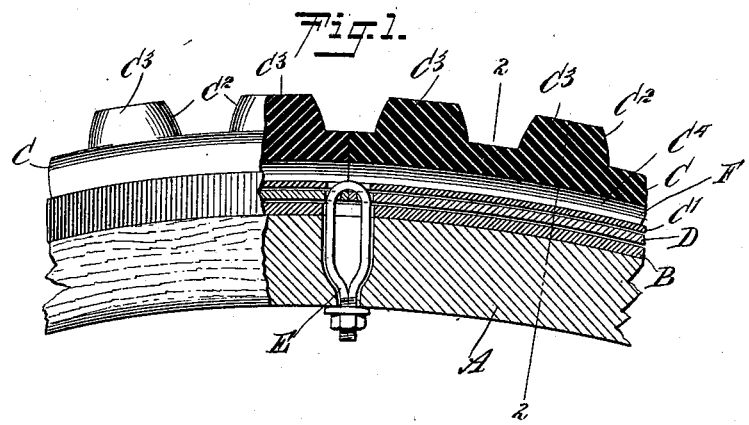
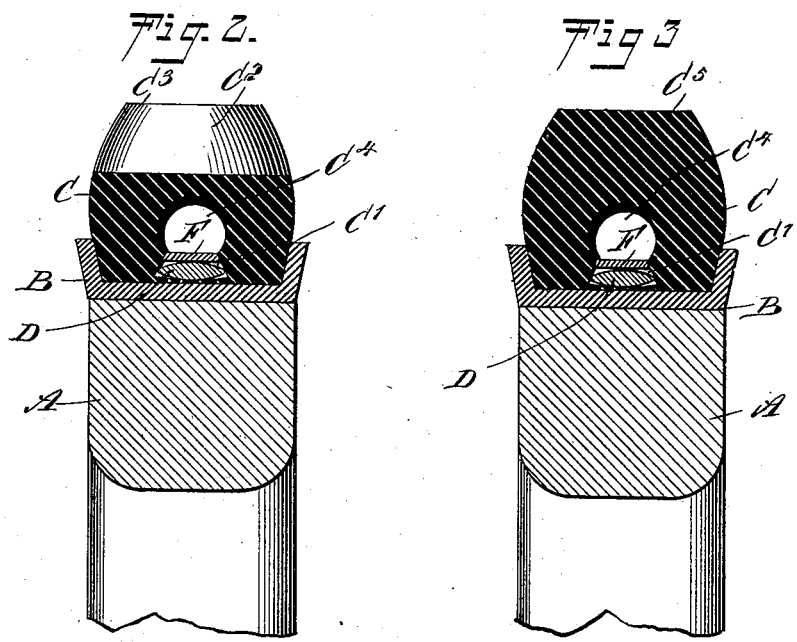
WITNESSES:
William P. Goebel.
Rev. G. Hoster.
INVENTOR
A. McI. Williamson.
BY
ATTORNEYS.

UNITED STATES PATENT OFFICE.

ANGUS McINTOSH WILLIAMSON, OF PHILADELPHIA, PENNSYLVANIA.

TIRE.

SPECIFICATION forming part of Letters Patent No. 592,184, dated October 19, 1897.

Application filed December 21, 1896. Serial No. 616,473. (No model.)

*To all whom it may concern:*

Be it known that I, ANGUS MCINTOSH WILLIAMSON, of Philadelphia, in the county of Philadelphia and State of Pennsylvania, have invented a new and Improved Tire, of which the following is a full, clear, and exact description.

The object of the invention is to provide a new and improved tire for the wheels of vehicles, arranged to insure easy riding, to pass without much danger over the uneven surface of streets and roads, and to assist in turning out of railroad-tracks, ruts, and the like without straining the wheel or the vehicle.

The invention consists of certain parts and details and combinations of the same, as will be fully described hereinafter, and then pointed out in the claim.

Reference is to be had to the accompanying drawings, forming a part of this specification, in which similar characters of reference indicate corresponding parts in all the figures.

Figure 1 is a sectional side elevation of the improvement. Fig. 2 is a transverse section of the same on the line 2 2 of Fig. 1, and Fig. 3 is a like view of a modified form of the improvement.

The vehicle-wheel on which the improvement is applied is provided with a suitable felly A, having a plane periphery, on which is secured a flanged band B, forming a channel for the reception of the inner part of a tire C, made of rubber or other suitable resilient material. The tire C is formed near its inner edge with a longitudinally-extending and transversely-elongated opening C' for the passage of a rod or bar D, having its ends fastened together and secured to the felly A by a loop-bolt E, as shown in Fig. 1, and as more fully described in the Letters Patent of the United States No. 571,872, granted to me on November 24, 1896.

The peripheral surface of the tire C is provided with integral spaced projections $C^2$ of conoidal shape and having their top faces $C^3$ cut off or flattened to form the tread for the tire, as is plainly indicated in Figs. 1 and 2.

Directly above the opening C', previously referred to, is formed a longitudinal and circular opening $C^4$, separated from the other opening by a strip F of leather or other suitable material for strengthening the side walls of the tire at the openings C' and $C^4$ and covering up the rod D. Now it will be seen that by the arrangement described the projections $C^2$ are rendered inwardly yielding when pressure is applied, owing to the opening $C^4$, so that the tire insures easy riding of the vehicle when passing over rough roads or uneven surfaces in a paved street. It will further be seen that when the wheel travels over the surface of a road its action is step-like, as the projections $C^2$ come successively in contact with the surface. The projections are of conoidal form, as indicated in the drawings, so that when the wheel passes upon a railroad-track or rut it greatly assists the wheel in passing over the same without straining the wheel or the vehicle and without danger of the wheel sliding along the rail or the side wall of the rut, as is the case with ordinary tires now employed. It will also be seen that by the arrangement described the wheel readily passes up inclined planes without danger of slipping, so that the tire is very serviceable for use on horseless carriages and the like to prevent slipping of the machine when going uphill.

As the projections are integral with the tire, there is no danger of the tire becoming loose, and if desired the tire may be made in sections removably held on the rods D, so as to replace any portion of the tire that has become worn out or damaged by accident. The resilient properties are greatly aided on toning down the impact of the tire with the surface over which the wheel passes. As shown in Fig. 3, the projections are omitted, but the tread is formed by a continuous plane flat surface $C^5$, which makes it radically different from the cone-shaped tires now in use and neutralizes the sidewise swaying of the wheel when it passes over paved streets and rough roads.

Having thus fully described my invention, I claim as new and desire to secure by Letters Patent—

As a new article of manufacture, a resilient tire having its body portion formed with a longitudinal and transversely-elongated opening near the central portion of its inner edge extending throughout its length, and in which is received a fastening-band, a second opening which is longitudinal and circular and located immediately above the aforesaid transversely-elongated opening, being in conjunction therewith, but separated therefrom by a strip of flexible material resting upon the fastening-band, and spaced projections of conoidal form and having their outer faces flattened, said projections being integral with the body portion of the tire and extending from the peripheral wall thereof above the longitudinal openings, as and for the purpose set forth.

ANGUS McINTOSH WILLIAMSON.

Witnesses:
 THEO. G. HOSTER,
 JNO. M. RITTER.